(12) United States Patent
Marotta et al.

(10) Patent No.: US 9,914,087 B2
(45) Date of Patent: *Mar. 13, 2018

(54) SORBENT DEVICES AND METHODS OF USING THEM

(71) Applicants: Lee Marotta, North Bergen, NJ (US); Miles Snow, Newmarket (CA)

(72) Inventors: Lee Marotta, North Bergen, NJ (US); Miles Snow, Newmarket (CA)

(73) Assignee: PerkinElmer Health Sciences, Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/941,753

(22) Filed: Nov. 16, 2015

(65) Prior Publication Data

US 2016/0158687 A1 Jun. 9, 2016

Related U.S. Application Data

(63) Continuation of application No. 13/778,594, filed on Feb. 27, 2013, now Pat. No. 9,186,613, which is a
(Continued)

(51) Int. Cl.
*B01D 53/04* (2006.01)
*B01J 20/20* (2006.01)
(Continued)

(52) U.S. Cl.
CPC ..... *B01D 53/0423* (2013.01); *B01D 53/0407* (2013.01); *B01J 20/06* (2013.01); *B01J 20/103* (2013.01); *B01J 20/20* (2013.01); *B01J 20/26* (2013.01); *B01J 20/28052* (2013.01); *B01J 20/3416* (2013.01); *B01D 2253/102* (2013.01); *B01D 2253/116* (2013.01); *B01D 2257/708* (2013.01); *B01D 2258/06* (2013.01); *B01D 2259/4148* (2013.01); *B01J 2220/64* (2013.01)

(58) Field of Classification Search
CPC ............ B01D 53/0407; B01D 53/0423; B01D 2253/102; B01D 2253/116; B01D 2257/708; B01D 2259/4148; B01J 20/06; B01J 20/103; B01J 20/20; B01J 20/26; B01J 20/28052; B01J 20/3416; B01J 2220/64
USPC .............. 95/82–89, 141–143, 148, 900, 903; 96/101–107, 132, 413; 502/400, 416; 73/23.2, 23.35, 23.41, 863.12, 863.21, 73/23.29
See application file for complete search history.

(56) References Cited

U.S. PATENT DOCUMENTS

| | | | | |
|---|---|---|---|---|
| 2,798,718 A | * | 7/1957 | Gross | A62B 23/00 267/161 |
| 6,402,813 B2 | * | 6/2002 | Monereau | B01D 53/0415 55/512 |
| 2002/0157483 A1 | * | 10/2002 | Lo | G01N 1/22 73/864.71 |

* cited by examiner

*Primary Examiner* — Frank Lawrence
(74) *Attorney, Agent, or Firm* — Rhodes IP PLC; Christopher R Rhodes

(57) ABSTRACT

Certain aspects and examples are directed to sorbent devices and methods of using them. In certain embodiments, a sorbent device comprising a body comprising a sampling inlet, a sampling outlet and a cavity between the inlet and the outlet, the cavity comprising a serial arrangement of at least four different sorbent materials is described. In some embodiments, the sorbent materials are arranged from a material with a weakest sorbent strength to a material with a strongest sorbent strength with the weakest sorbent strength material adjacent to the sampling inlet.

16 Claims, 8 Drawing Sheets

Related U.S. Application Data continuation of application No. 12/573,048, filed on Oct. 2, 2009, now Pat. No. 8,388,736.

(51) Int. Cl.
*B01J 20/06* (2006.01)
*B01J 20/10* (2006.01)
*B01J 20/28* (2006.01)
*B01J 20/34* (2006.01)
*B01J 20/26* (2006.01)

Table I

Restek 502.2 mix #1
Part # 30042

| | | | |
|---|---|---|---|
| dichlorodifluoromethane | bromomethane | Individual mixes | |
| chloromethane | chloroethane | PAH Compounds | |
| vinyl chloride | trifluorochloromethane | 1-Methyl Napthalene | 10 ug Diesel |
| | | Anthracene | |
| | | Fluorene | |
| | | Phenanthrene | |

Restek 8260B Mega mix
Part # 30633

| | |
|---|---|
| Acetonitrile | trans-1,3-dichloropropene |
| Acrylonitrile | diethyl ether |
| Allyl Chloride | 1,4-dioxane |
| Benzene | ethyl benzene |
| Bromobenzene | ethyl methacrylate |
| Bromochloromethane | hexachloro-1,3-butadiene |
| Bromodichloromethane | iodomethane |
| Bromoform | isobutyl alcohol |
| n-butyl benzene | isopropyl benzene |
| sec-butyl benzene | 4-isopropyl toluene |
| tert-butyl benzene | methacrylonitrile |
| carbon disulfide | methyl acrylate |
| carbon tetrachloride | methyl methacrylate |
| chlorobenzene | methylene chloride |
| 2-chloroethanol | naphthalene |
| chloroform | nitrobenzene |
| chloroprene | 2-nitropropane |
| 2-chlorotoluene | pentachloroethane |
| 4-chlorotoluene | propionitrile |
| dibromodichloromethane | n-propylbenzene |
| 1,2-dibromo-3-chloropropane | styrene |
| 1,2-dibromoethane | 1,1,1,2-tetrachloroethane |
| dibromomethane | 1,1,2,2-tetrachloroethane |
| 1,2-dichlorobenzene | tetrachloroethylene |
| 1,3-dichlorobenzene | tetrahydrofuran |
| 1,4-dichlorobenzene | toluene |
| cis-1,4-dichloro-2-butene | 1,2,3-trichlorobenzene |
| trans-1,4-dichloro-2-butene | 1,2,4-trichlorobenzene |
| 1,1-dichloroethane | 1,1,1-trichloroethane |
| 1,2-dichloroethane | 1,1,2-trichloroethane |
| 1,1-dichloroethene | trichloroethylene |
| cis-1,2-dichloroethene | 1,2,3-trichloropropane |
| trans-1,2-dichloroethene | 1,1,2-trichlorotrifluoroethane |
| 1,2-dichloropropane | 1,2,4-trimethylbenzene |
| 1,3-dichloropropane | 1,3,5-trimethylbenzene |
| 2,2-dichloropropane | m-xylene |
| 1,1-dichloropropene | o-xylene |
| cis-1,3-dichloropropene | p-xylene |

FIG. 6

Stacked representation of Total Ion Chromatogram (TIC)

SORBENT DEVICES AND METHODS OF USING THEM

TECHNOLOGICAL FIELD

Certain features, aspect and embodiments are directed to sorbent tubes for use in sampling species. In particular, certain embodiments are directed to multi-bed sorbent tubes that include a plurality of different sorbent materials.

BACKGROUND

One common application of chromatographic analysis is the use of thermal desorption units to determine the constituents of a particular environment. For example, it is often desired to detect the amount of volatile organic compounds (VOCs) present in a certain sample of air. One way of doing this is by first transporting a sorbent tube packed with an adsorbent material into the environment to be tested, and allowing the VOCs in the air to be collected. In each case, the analytes to be measured (i.e., the VOCs) are retained by the adsorbent as the air passes through the tube.

SUMMARY

In one aspect, a sorbent device comprising a body comprising a sampling inlet, a sampling outlet and a cavity between the inlet and the outlet, the cavity comprising a serial arrangement of at least four different sorbent materials in which the sorbent materials are arranged from a material with a weakest sorbent strength to a material with a strongest sorbent strength with the weakest sorbent strength adjacent to the sampling inlet is provided.

In certain embodiments, the device comprises a fluid permeable barrier between each of the different sorbent materials. In some embodiments, the fluid permeable barrier comprises a steel mesh. In additional embodiments, at least one of the four different sorbent materials comprises a carbon black or a graphitized carbon black. In additional embodiments, each of the four different sorbent materials independently is a graphitized carbon black or a carbon molecular sieve with none of the materials being the same material. In other embodiments, the sorbent materials are effective to desorb substantially all volatile organic species adsorbed to the four different sorbent materials in a single desorption cycle. In certain examples, the sorbent materials are effective to be reused without any temperature treatment steps after the single desorption cycle.

In another aspect, a sorbent device effective to adsorb and desorb volatile organic species in a sample, the sorbent device comprising a hollow tube comprising a body, a sampling inlet and a sampling outlet, the body comprising an interior volume in which at least four different sorbent materials are disposed, the sorbent materials being effective to desorb substantially all of the volatile organic species adsorbed to the sorbent materials in a single desorption cycle, in which the sorbent materials are arranged serially from a material with a weakest sorbent strength to a material with a strongest sorbent strength with the weakest sorbent strength adjacent to the sampling inlet is described.

In certain examples, the different sorbent materials are separated from each other by a fluid permeable barrier. In some examples, the fluid permeable barrier comprises a steel mesh. In other examples, at least one of the four different sorbent materials comprises a carbon black or a graphitized carbon black. In additional examples, each of the four different sorbent materials independently is a graphitized carbon black or a carbon molecular sieve with none of the materials being the same material. In certain embodiments, the sorbent materials are effective to be reused without any temperature treatment steps after the single desorption cycle.

In an additional aspect, a device comprising a body comprising a sampling inlet, a sampling outlet and a cavity between the inlet and the outlet, the cavity comprising at least three different sorbent materials disposed serially in the cavity, in which each of the different sorbent materials are separated by a fluid permeable barrier is described.

In certain embodiments, the fluid permeable barrier comprises steel mesh. In other embodiments, at least one of the three different sorbent materials comprises a carbon black or a graphitized carbon black. In some embodiments, each of the three different sorbent materials independently is a graphitized carbon black or a carbon molecular sieve with none of the materials being the same material. In certain examples, the sorbent materials are effective to desorb substantially all volatile organic species adsorbed to the three different sorbent materials in a single desorption cycle. In other examples, the sorbent materials are effective to be reused without any temperature treatment steps after the single desorption cycle. In additional examples, the strongest sorbent material is disposed adjacent to the sampling outlet, the weakest sorbent material is disposed adjacent to the sampling inlet and the other sorbent material is between the strongest sorbent material and the weakest sorbent material.

In another aspect, a sorbent device effective to adsorb and desorb volatile organic species in a sample, the sorbent device comprising a hollow tube comprising a body, a sampling inlet and a sampling outlet, the body comprising an interior volume in which at least three different sorbent materials are disposed, the sorbent materials being effective to desorb substantially all of the volatile organic species adsorbed to the sorbent materials in a single desorption cycle is provided.

In certain examples, the different sorbent materials are separated from each other by a fluid permeable barrier. In some examples, the fluid permeable barrier comprises a steel mesh. In additional examples, at least one of the three different sorbent materials comprises a carbon black or a graphitized carbon black. In certain embodiments, each of the three different sorbent materials independently is a graphitized carbon black or a carbon molecular sieve with none of the materials being the same material. In other embodiments, the strongest sorbent material is disposed adjacent to the sampling outlet, the weakest sorbent material is disposed adjacent to the sampling inlet and the other sorbent material is between the strongest sorbent material and the weakest sorbent material.

In an additional aspect, a method comprising exposing a sorbent device to an environment comprising volatile species to permit the volatile species to adsorb to the sorbent device, the sorbent device comprising a plurality of different sorbent materials; and desorbing the species adsorbed to the sorbent device using a single desorption cycle to desorb substantially all adsorbed species in the sorbent device is described.

In certain embodiments, the method can include reusing the sorbent device to permit adsorption of volatile species to the sorbent device without any further temperature treatment steps to remove residual adsorbent. In other embodiments, the sorbent device comprises at least three or at least four different sorbent materials disposed serially in the cavity, in which each of the different sorbent materials are separated by a fluid permeable barrier. In some embodiments, at least one of the three or four different sorbent materials comprises a carbon black or a graphitized carbon black. In other embodiments, each of the three or four different sorbent materials independently is a carbon black or a carbon molecular sieve with none of the materials being the same material. In additional embodiments, the strongest sorbent material is disposed adjacent to the sampling outlet, the weakest sorbent material is disposed adjacent to the sampling inlet and the other sorbent material or materials are between the strongest sorbent material and the weakest sorbent materials and arranged from weakest sorbent strength to strongest sorbent strength.

In another aspect, a method of facilitating analysis of an air space, the method comprising providing a sorbent device comprising a sampling inlet, a sampling outlet and a cavity between the sampling inlet and the sampling outlet, the cavity comprising at least three or at least four different sorbent materials disposed serially in the cavity, in which each of the different sorbent materials are separated by a fluid permeable barrier and in which none of the three or four sorbent materials are the same sorbent material is described.

In certain examples, the method can include providing instructions for using the sorbent device in a single thermal desorption cycle to desorb substantially all species adsorbed to the sorbent device. In some examples, the method can include providing an analytical device for use with the sorbent device. In additional examples, the method can include providing a pump for use with the sorbent device. In other examples, the sampling may be performed passively.

In an additional aspect, a device comprising a hollow tube comprising a sampling inlet, a sampling outlet and a cavity comprising an internal volume between the sampling inlet and the sampling outlet, the device further comprising a first, second, third and fourth sorbent material in the internal volume of the cavity, in which the first sorbent material is a weaker sorbent material than the second sorbent material, the second sorbent material is a weaker sorbent material than the third sorbent material, and the third sorbent material is a weaker sorbent material than the fourth sorbent material, in which the fourth sorbent material is adjacent to the sampling outlet, the first sorbent material is adjacent to the sampling inlet, the second sorbent material is adjacent to the first sorbent material and between the first sorbent material and the third sorbent material, and the third sorbent material is adjacent to the fourth sorbent material and between the second sorbent material and the fourth sorbent material is provided.

In certain embodiments, the device can include a first fluid permeable barrier separating the first sorbent material and the second sorbent material, a second fluid permeable barrier separating the second sorbent material and the third sorbent material, and a third fluid permeable barrier separating the third sorbent material and the fourth sorbent material. In some embodiments, at least one of the first, second, third and fourth sorbent materials comprises a carbon black. In other embodiments, each of the first, second, third and fourth sorbent materials independently is a carbon black or a carbon molecular sieve with none of the materials being the same material.

Additional features, aspects, examples and embodiments are described in more detail below.

BRIEF DESCRIPTION OF THE FIGURES

Certain illustrative embodiments are described in more detail below with reference to the accompanying figures in which:

FIG. 6 is a table showing analytes adsorbed and desorbed to a sorbent device, in accordance with certain examples;

Figure 1:
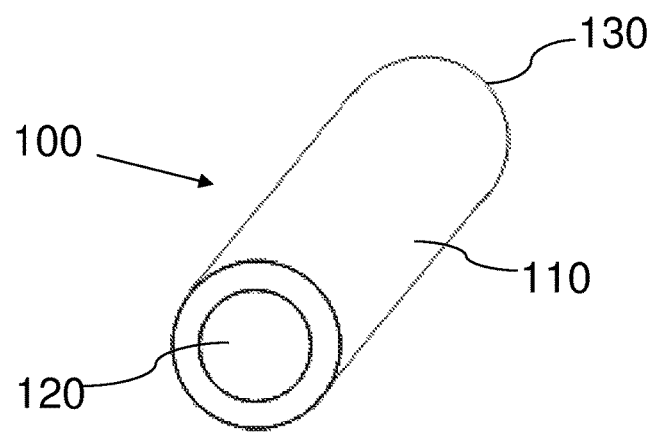
FIG. 1 is a perspective view of a sorbent device, in accordance with certain examples.

Certain dimensions and components shown in the figures may have been enlarged, distorted, exaggerated or otherwise shown in a non-conventional manner to facilitate a better understanding of the technology described herein. The lengths, widths, cross-sectional shapes and the like shown in the figures are merely illustrative, and other lengths, widths and cross-sectional shapes will be readily selected by the person of ordinary skill in the art, given the benefit of this disclosure.

DETAILED DESCRIPTION

Examples of the sorbent devices described herein can be used in many different applications including, but not limited to, indoor and outdoor air monitoring, analysis of the offgasing of soil, water, biofuels, polymers, packaging materials, flavors and fragrances, cosmetics, exhaust gases, and many other applications where volatile species may be present. The particular materials selected for inclusion in the sorbent devices may vary depending on the particular species to be analyzed. The term sorbent device is used for convenience purposes only, and the sorbent devices described herein are effective to adsorb (or absorb) and desorb analyte species. In certain embodiments, by selecting combinations of a plurality of different sorbent materials, the sorbent devices provide effective desorption and can be reused after a single desorption cycle without temperature treatment to remove any residual adsorbent.

In certain embodiments, the sorbent devices described herein include three or more different types of a packing material, also referred to herein as a sorbent material that can be used for adsorption. In certain examples, the sorbent devices described herein can be used with chromatographic analysis to determine the constituents of a particular environment. For example, it is often desired to detect the amount of volatile organic compounds (VOCs) present in a certain sample of air. The VOCs may be collected by drawing a sample of gas (typically ambient air) through such a tube using a syringe, small vacuum pump, or other means. This latter method is commonly referred to as "pumped sampling." In each case, the analytes to be measured, e.g., the VOCs, are retained by the sorbent material as the air passes through the sorbent device. Once the VOCs are collected, the sorbent device having the adsorbed analytes is subsequently heated in a thermal desorption instrument, and a flow of inert gas, such as helium, nitrogen or hydrogen, is provided to sweep the VOCs out of the sorbent device and into a chromatographic column for separation and analysis.

In certain examples, the sorbent devices described herein can be used in soil vapor intrusion analyses. Soil vapor intrusion occurs when toxic compounds that are present in the air space in soil of a contaminated location enter a building, potentially creating a health risk. Many contaminated sites have high diesel levels and toxic polynuclear aromatic compounds, in addition to the current EPA air toxics list of components. When sampling sites using currently available desorption tubes, diesel entering the tube would not be easily released thereby rendering the tube unusable for re-sampling. In addition, because of the strong adsorptive nature of the tube, polynuclear aromatic compounds with boiling points above naphthalene are not quantitatively desorbed from the tube, making the quantitative investigation of these compounds difficult or not possible. Also, when initially sampling a site, there are many unknown compounds. The EPA has identified target analytes that are of health concern which need to be captured by the tubes; however, these sites contain other compounds which are not regulated. Thus, these unknown compounds may interfere with the analysis or may not be detected using current tube designs.

In certain embodiments and in addition to the problems encountered with heavier hydrocarbon species, many lighter species can break through, e.g., may adsorb in only small quantities or not at all or may desorb too quickly, which can reduce the likelihood these species are detected at all or can lead to errors in quantitation. Also, many government regulations have decreased the detection limits required for soil vapor intrusion testing. Extending the sampling volume to decrease detection limits can cause a problem of break through for many lighter components when using available sampling devices.

Figure 2:
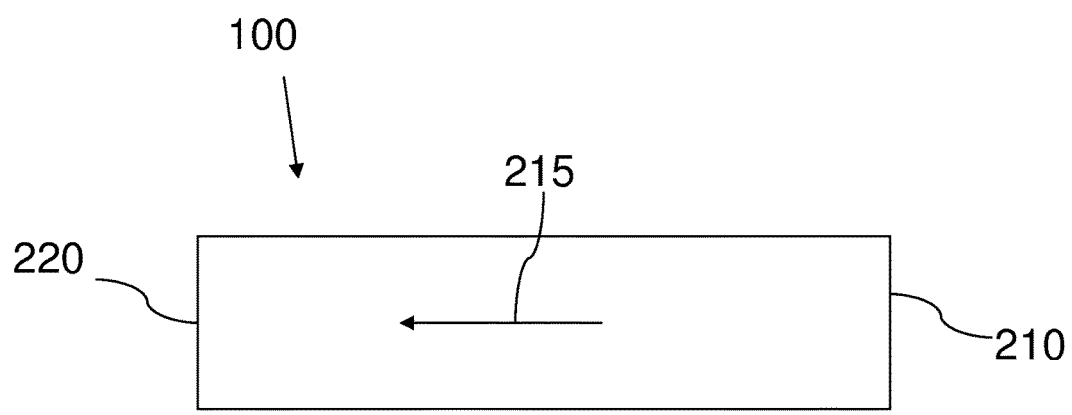
FIG. 2 is a side view of a sorbent device showing the sampling inlets and outlets and the desorption inlets and outlets, in accordance with certain examples.

In certain embodiments, the sorbent devices described herein may include a suitable structure to permit entry of fluids, e.g., gases, into the sorbent device such that the fluids can adsorb, at least temporarily, to the sorbent material in the sorbent device. FIG. 1 shown an illustrative sorbent device. The device 100 comprises a body 110 comprising a sampling inlet 120 and a sampling outlet 130. Between the sampling inlet 120 and the sampling outlet 130 is an internal cavity. In the configuration shown in FIG. 1, the sorbent device is configured as a hollow tube or cylinder. The different types of sorbent media (not shown) are disposed in the cavity occupying at least some portion of the internal volume of the body 110. In certain instances, the entire internal volume can be occupied by the different sorbent materials, whereas in other examples, at least some portion of the internal volume can remain open, e.g., areas adjacent to the sampling inlet 120 and the sampling outlet 130 may be empty. In use, the sorbent device 100 can be placed in an environment, and fluids such as volatile gases can be permitted to diffuse into the sorbent device or otherwise drawn into the sorbent device using a pump or other similar device, or adsorb passively. After a desired period, the sorbent device 100 can be sealed prior to analysis. The sorbent device 100 can be fluidically coupled to an analytical device, e.g., a GC or GC/MS, and a carrier gas can be swept through the sorbent device 100 in the general direction of arrow 215 in FIG. 2, typically accompanied by heating, to desorb the adsorbed species. Referring to FIG. 2, in one configuration, the carrier gas can be provided to the desorption inlet 210 (also referred to as the sampling outlet 130 in FIG. 1). The adsorbed species exit the sorbent device 100 through the desorption outlet 220 (also referred to as the sampling inlet 120 in FIG. 1). The desorbed species may then be provided to a column (not shown) to separate them, followed by subsequent analysis using a suitable detector such as a flame ionization detector, electrochemical detector, mass spectrometer or other suitable detectors commonly found in or used with gas chromatography systems.

Figure 3:
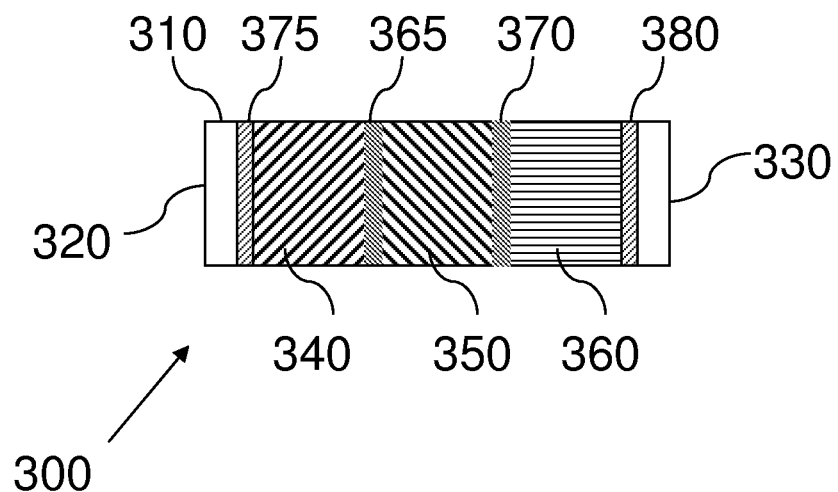
FIG. 3 is a cross-section view of a sorbent device comprising three sorbent materials, in accordance with certain examples.

In another embodiment, the sorbent device can include three different sorbent materials each separated by a fluid permeable barrier. One illustration is shown in FIG. 3. The device 300 comprises a body 310. When sampling, the sample enters the sampling inlet 320. The components are adsorbed onto the adsorbents, and unretained material exits the tube through sampling outlet 330. Disposed internally in a cavity of the body 310 is a first sorbent material 340, a second sorbent material 350 and a third sorbent material 360. The first sorbent material 340, the second sorbent material 350 and the third sorbent material 360 can be separated from each other by fluid permeable barriers 365 and 370. The fluid permeable barriers 365 and 370 can be any suitable material that permits diffusion of a fluid from one portion of the sorbent device, through the barrier and onto another portion of the sorbent device. In this tube design, a thin mesh screen is used; however, glass frits or other fluid permeable barrier can also be used. Illustrative fluid permeable barriers include those described herein. Barrier or clips 375 and 380 can be used to keep the sorbent materials 340, 350 and 360 in the body 310 of the sorbent device 300. In a desorption cycle, the tube 300 is inserted into the carrier stream and species desorb and elute in a reverse direction from which they were sampled; an inert gas is introduced into the sampling outlet (or desorption inlet) 330, and as species desorb from the sorbent materials 340, 350 and 360, the desorbed species exit the sorbent device 300 through the sampling inlet (or desorption outlet) 320, which is typically in fluid communication with a fluid line in a gas chromatography system or other analytical device.

In producing the sorbent devices described herein, the sorbent materials can be packaged into the sorbent device in a selected order. In certain embodiments, the stronger sorbents may be packed adjacent to the sampling outlet, and weaker sorbent materials may be packed against the stronger sorbent materials in serial fashion according to their relative ability to adsorb species. Such packing permit sampling in the direction of weakest to strongest sorbent material and permits analysis in the direction from strongest to weakest sorbent material. The terms stronger and weaker are relative terms, and the adsorption strength and desorption efficiency are functions of surface area, pore size(s) and shape(s), pore volume and surface chemistry of the sorbent materials. No absolute strength is required, rather the various materials that are used are stronger or weaker adsorbers relative to another material. It will be within the ability of the person of ordinary skill in the art, given the benefit of this disclosure, to select a material that is stronger or weaker than another material. The higher boiling point compounds are retained by the weaker sorbent materials and the lighter analytes break through and are retained by the stronger sorbent materials. Thus, when compounds are adsorbed to the sorbent devices, the high boiling point materials would be located in sorbent material adjacent to the sampling inlet (or desorption outlet) and the low boiling point materials would be adsorbed on sorbent materials closer to the sampling outlet (or desorption inlet). Some even lighter components (like gases) break through and are retained by the strongest adsorbent immediately adjacent to the sampling outlet. The particular ordering of sorbent materials may be selected to increase the probability that all species adsorb and then desorb from the sorbent device. For example, it is desirable to leave sites in the stronger sorbent material to be available to adsorb the lighter components. In addition, if the higher molecular weight analytes become adsorbed to the stronger or strongest sorbent material, they may not desorb. By sampling in one direction and desorbing in the opposite direction, the higher molecular weight materials do not occupy or enter into the stronger sorbent materials, which increases the likelihood that they will fully desorb from the sorbent device.

Figure 4:
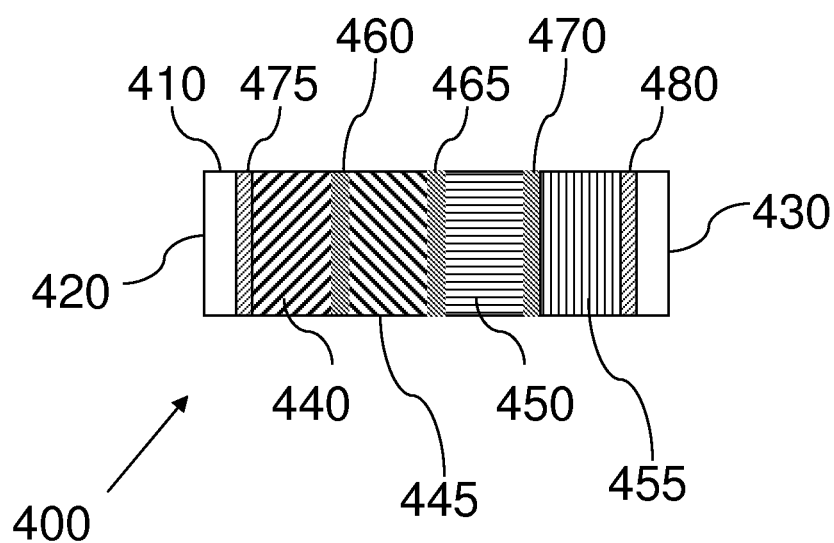
FIG. 4 is a cross-section view of a sorbent device comprising four sorbent materials, in accordance with certain examples.

In an additional embodiment, the sorbent device can include four different sorbent materials each separated by a fluid permeable barrier. An illustration of such is shown in FIG. 4. The device 400 comprises a body 410, a sampling inlet 420, and a sampling outlet 430. Disposed internally in a cavity of the body 410 is a first sorbent material 440, a second sorbent material 445, a third sorbent material 450 and a fourth sorbent material 455. The first sorbent material 440, the second sorbent material 445, the third sorbent material 450 and the fourth sorbent material 455 can be separated from each other by fluid permeable barriers 460, 465 and 470. As described above, the first sorbent material 440 can be a weak sorbent material such that lighter analytes break through and heavier analytes are adsorbed. The second sorbent material 445 can be a stronger sorbent material than the first sorbent material 440 and a weaker sorbent material than the third sorbent material 450. The fourth sorbent material 455 can be the strongest of the sorbent materials in the sorbent device 400. The fluid permeable barriers 460, 465 and 470 can be any suitable material that permits diffusion of a fluid from one portion of the sorbent device, through the barrier and onto another portion of the sorbent device. In this tube, a thin mesh screen is used; however, it may be a glass frit, a coated stainless steel mesh or other suitable fluid permeable barriers. Illustrative fluid permeable barriers include those described herein. Barriers or clips 475 and 480 can be used to keep the sorbent materials 440, 445, 450 and 455 in the body 410 of the sorbent device 400. In a desorption cycle, the tube 400 is inserted into the flow path in the reverse direction that it was sampled by introducing an inert gas into the desorption inlet (or sampling outlet) 430, and as species desorb from the sorbent material 440, 445, 450 and 455, the desorbed species exit the sorbent device 400 through the desorption outlet (or sampling inlet) 420, which is typically in fluid communication with a fluid line in a gas chromatography system or other analytical device.

In certain embodiments, more than four materials can be used in a sorbent device. For example, it may be desirable to include five, six, seven or more types of sorbent materials within the sorbent tubes to facilitate analysis of species. The number of sorbent materials used in the sorbent devices can vary depending on the number of analytes and the types of analytes suspected to be present. Where the number and type of analytes are unknown, a sorbent device including a plurality of different types of sorbent materials can be used to ensure that substantially all of the analytes can be analyzed. In one embodiment where more than four sorbent materials are used, the sorbent materials can be arranged from weakest to strongest with the weakest sorbent material being closest to the sampling inlet and the strongest sorbent material being closest to the sampling outlet.

While FIGS. 2-4 show the various sorbent material areas as being substantially the same, it may be desirable to include a particular sorbent material in a larger amount that the other sorbent materials. For example, where a sample is suspected of having a large concentration of a particular analyte, the sorbent material effective to adsorb and desorb that analyte may be present in a larger amount/volume to provide for increased loading of that analyte. In certain examples, the sorbent materials can each be present at substantially the same weight ratio, e.g., 1:1. In other examples, the different sorbent materials can independently be present in weight ratios ranging from 3:1, 2.5:1, 2:1, 1.5:1, 1.1:1, 0.9:1, 0.8:1, 0.7:1, 0.6:1, 0.5:1, 0.4:1, 0.3:1, 0.2:1, 0.1:1 or any ratio in between these illustrative ratios. It may be desirable to determine the relative weight ratios using the first sorbent material (the one closest to the sampling inlet) as the normalization factor, and the amount of each of the other sorbent materials that is present can be divided by the amount of the first sorbent material that is present to determine the relative weight ratios present in the sorbent device. In some examples where a four bed sorbent device is used, about 1.4 to 0.6 of the first sorbent material, 1.54 to 0.56 of the second sorbent material, 1.92 to 0.82 of the third sorbent material and 1.5 to 0.64 of the fourth sorbent material may be present in the sorbent device. Additional suitable amounts of the sorbent materials will be readily selected by the person of ordinary skill in the art, given the benefit of this disclosure.

In certain embodiments, one or more of the sorbent material types used in the sorbent devices described herein may be based on, or include, a graphitized carbon black, a carbon molecular sieve, or combinations thereof. In some examples, the sorbent material may be based on a mixture of graphitized carbon blacks of different strengths, graphite, carbon molecular sieves, polymer resins, an oxide, fused silica beads, glass, quartz, charcoal, porous polymers, amisorbs or other materials. In certain embodiments, the different sorbent material in the sorbent devices may have a different chemical composition, e.g., each may include or be a different carbon black. In some examples, the sorbent material may be a derivatized form, e.g., a derivatized carbon black.

In some examples, the sorbent material can be a graphitized carbon black such as, for example, Carbotrap™ B sorbent or Carbopack™ B sorbent, Carbotrap™ Z sorbent or Carbopack™ Z sorbent, Carbotrap™ C sorbent or Carbopack™ C sorbent, Carbotrap™ X sorbent or Carbopack™ X sorbent, Carbotrap™ Y sorbent or Carbopack™ Y sorbent, Carbotrap™ F sorbent or Carbopack™ F sorbent, any one or more of which may be used in its commercial form (available commercially from Supelco or Sigma-Aldrich) or may be graphitized according to known protocols. In other examples, the sorbent material can be carbon molecular sieves such as Carboxen™ 1000 sorbent, Carboxen™ 1003 sorbent, or Carboxen™-1016 sorbent, any one or more of which may be used in its commercial form (available commercially from Supelco or Sigma-Aldrich) or may be optimized according to known protocols. In certain embodiments where four different sorbent materials are present, each of the sorbent materials may be one of the sorbent materials listed in this paragraph with each of the sorbent materials being a different sorbent material than the other sorbent materials used in the sorbent device. In such instances, four different sorbent materials would be present in the sorbent device.

In certain examples, the mesh size or range of the sorbent can vary depending on the particular material selected. In some examples, the mesh size can range from 20 to about 100, more particular from about 20-80, 30-70 or 40-60. In other examples, the mesh size range may be from about 20-40, 40-60, 60-80 or 80-100 depending on the material used in the sorbent devices. Other suitable mesh sizes will be readily selected by the person of ordinary skill in the art, given the benefit of this disclosure.

In certain embodiments, the body of the sorbent device may be made from, or include, many different types of materials. In some examples, quartz, stainless steel, coated stainless steel or other metal or non-metal based materials that can tolerate the temperature cycles used to desorb the analytes can be used.

In certain embodiments, the sorbent devices described herein can be produced by disposing a suitable type and amount of sorbent material in a body. For example, one end of a hollow stainless steel tube can be equipped with a stationary screen to retain the first sorbent material in the tube. A first sorbent material can be disposed in the tube. A second fluid permeable barrier can be placed on or in the disposed first sorbent material, and a second sorbent material can then be disposed on the second fluid permeable barrier. This process can be repeated until a desired number of sorbent materials are present in the tube. Following the last sorbent, a fluid permeable barrier can be placed against it and a clip can be inserted to hold the adsorbents in place. In this configuration, the sorbent materials are held in place on one end by a stationary fluid permeable barrier and on the other end by a clip. Other similar retention devices can be used to hold the sorbents in the body of the sorbent device.

In certain examples, once the sorbent devices are prepared, the integrity of the device can be assessed prior to use. For example, internal voids may form that can affect the quality of the tubes. In some examples, the quality of the desorption tubes can be assessed as described in commonly assigned issued patent bearing U.S. Pat. No. 7,422,625, the entire disclosure of which is incorporated herein by reference, to ensure there are no undesirable voids or features in the sorbent device.

In certain embodiments, the sorbent devices described herein can be used with automated thermal desorption (ATD) gas chromatography system. In one embodiment, ATD works by heating the sorbent device for a required amount of time to release volatiles from the sorbent material. During this heating, a carrier gas such as helium, nitrogen or hydrogen flows through the tube at a desired flow rate to transfer the contents of the sorbent tube onto a cooled secondary trap via a carrier gas, which is typically helium or hydrogen. This trap is then rapidly heated to desorb the collected components in a narrow band into the GC column for separation. A mass spectrometer is the most common detector used to provide the analysis. The information is sent to a computer containing an application which sends information to the instrument for control and collects information from the detector for analysis. This application has the ability to process this information which can provide quantitative and qualitative results.

By including many different types of sorbent materials in the sorbent devices, a single desorption cycle can be used to desorb substantially all adsorbed species. Such desorption typically permits reuse of the sorbent device without further temperature treatment, e.g., baking for extended periods, to remove high molecular weight species.

In certain embodiments, the sorbent devices described herein may be particularly advantageous for use where it is desirable to continuously monitor the air quality in an air space occupied by animals such as humans. The reusability of the sorbent devices permits automated monitoring without having to change out the tube. For example, air may be periodically sampled in an airplane cabin, cockpit, spacecraft cabin, space station or the like for the presence of volatile species that may lead to adverse health effects. In such instances, a single sorbent device can be used repeatedly. The ability to reuse the same tube without having to subject the tube to high temperatures permits their use in these applications and others including, but not limited to, repetitive air space sampling of foreign body atmospheres, e.g., moons, planets, and other applications where it may not be feasible to heat the tubes for extended periods prior to reuse.

Figure 5:
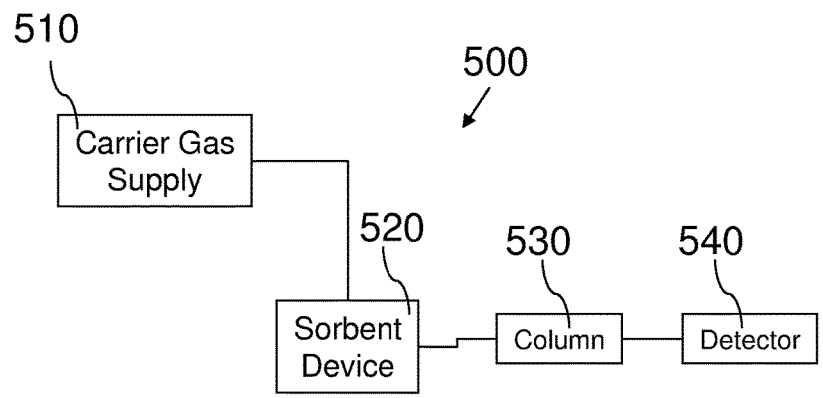
FIG. 5 is an illustration of a sorbent device in a gas chromatography system, in accordance with certain examples.

In accordance with certain examples, the sorbent devices described herein can be used with one or more instruments that are controlled or otherwise operated by, at least in part, a computer system. An illustrative system is shown in FIG. 5. The system 500 includes a carrier gas supply 510 fluidically coupled to a sorbent device 520, which may any of those described herein. Suitable valving or other devices may be present in the system to permit or restrict fluid flow between the carrier gas supply 510 and the sorbent device 520, depending on the desired flow of the carrier gas. In some examples, an injector may also be fluidically coupled to the sorbent device 520 and/or carrier gas supply 510, if desired. The sorbent device 520 is fluidically coupled to a column 530, which is effective to separate species based on their partitioning between the mobile phase and the column's stationary phase. Species that elute from the column 530 are provided to a detector 540, which can analyze those species based on chemical or physical properties. The detector can be any of those detectors commonly used in gas chromatographic systems including, but not limited to, a mass spectrometer, a flame ionization detector, a thermal conductivity detector, a thermionic detector, an electron-capture detector, a discharge ionization detector, a Hall electrolytic conductivity detector, an atomic emission detector, a flame photometric detector, a pulsed discharge ionization detector, a photoionization detector and other suitable types of detectors. In certain examples, the system 500 can include a computer system with a user interface such that a user may enter starting and final temperatures, temperature ramp parameters, sorbent device materials, and the like for use by the computer system in quantifying the analytes adsorbed to the sorbent devices. For example, in instances where a user already knows the particular set of analytes that are present, the user can select a previously entered chromatographic profile for use in the analysis. Other features for inclusion in a user interface will be readily selected by the person of ordinary skill in the art, given the benefit of this disclosure. In some examples, the sorbent devices described herein can be used with a swafer device such as those described in commonly assigned U.S. patent application Ser. No. 12/472,948 filed on May 27, 2009, the entire disclosure of which is hereby incorporated herein by reference for all purposes. In certain configurations where a swafer device is used, the carrier gas supply 510 and the sorbent device 520 can be fluidically coupled to different ports of the swafer device.

Certain embodiments of the sorbent devices described herein can provide numerous advantages including, but not limited to, the adsorption of the most volatile analytes (the gases) within acceptable break through limits while increasing sampling volumes to ensure detection limits are met and/or exceeded. Currently available tubes do not retain these volatile compounds and suffer from significant breakthrough of these compounds—as high as 60% sampling a 1 liter volume and as high as 80% sampling 10 liter volumes. Embodiments of the sorbent devices described herein can also provide excellent recovery (quantitative accuracy) of analytes because they are thermally desorbed from the tube during the tube desorb step which allows the analytes to be quantitatively introduced into the analytical system. Also, examples of the sorbent devices described herein can desorb analytes in a single desorption cycle to increase laboratory productivity and reduce costs rendering sampling financially feasible, because the tube is immediately available for re-sampling. Current tubes not only have poor recoveries of these analytes, but they are typically baked, at times for 10 hours, to rid the tube of these higher boiling point compounds, which reduces productivity and increases the cost per sample.

Certain specific examples are described in more detail below to illustrate further some of the novel aspects and features of the technology described herein.

Example 1

A sorbent device was produced using eight different sorbent materials. These sorbent materials were: graphitized carbon blacks such as CarboTrap™ or CarboPack™ F, C, Y, B, Z and X sorbents and carbon molecular sieves such as Carboxen™ 1000, 1016 and specially treated carboxens.

The sorbent devices were generally constructed as follows: An empty tube provided by PerkinElmer (part L427-0128) that contained a fixed fluid permeable membrane on one end was used. This end was the sampling end of the tube. The weakest adsorbent, CarboTrap™ F or CarboPack™ F sorbent was packed first into the tube using a funnel. The tube was tapped to ensure channeling of the adsorbent did not occur. A fluid permeable membrane, in this case, a stainless steel mesh from PerkinElmer (part #L407-1034) was inserted into the tube and lightly pressed against sorbent F. This procedure was performed on each of the next sorbents which entered the tube in the direction of weakest adsorbent to strongest adsorbent. After the last sorbent was added, the stainless steel mesh was inserted into the tube and lightly pressed against the strongest adsorbent. A clip, also known as a retaining spring, PerkinElmer (part #L407-1123), was inserted into the tube and pressed against the steel mesh securing the adsorbents in place. Since these sorbents had been exposed to ambient air and potential target analytes prior to and in the process of packing, new tubes were baked prior to sampling. New tubes were baked at 350 degrees C. for 90 minutes at a flow rate of 100 mL/min. The inert gas used for baking can be nitrogen or helium.

Example 2

A sorbent device was produced according to the protocol listed in Example 1. This device was specifically designed for soil vapor intrusion measurements, but not limited to this application. The sorbent device included the following types of sorbent materials (in order from the sampling inlet side of the tube to the sampling outlet side of the tube): Carbotrap™ F sorbent, Carbotrap™ Y sorbent, Carbotrap™ X sorbent and a carboxen sorbent material. This tube design provides excellent retention of the gases in addition to significantly extending the molecular weight range through diesel which is required in soil vapor samples.

Example 3

A sorbent device was produced according to the protocol listed in Example 1. This device was designed for the analysis where the gases in US EPA Methods TO-15/TO-17 target analytes are not required specifically dichlorodifluoromethane, chloromethane, vinyl chloride, bromomethane, chloroethane, and trichlorofluoromethane. The advantage is when the strongest adsorbent is eliminated the tubes are significantly more hydrophobic requiring less dry purge time and faster analysis. In addition, a larger bed of weaker adsorbent may be used to decrease desorption times. The sorbent device included the following types of sorbent materials (in order from the sampling inlet side of the tube to the sampling outlet side of the tube): Carbotrap F™ sorbent, Carbotrap Y™ sorbent, and Carbotrap X™ sorbent.

Example 4

A sorbent device was produced according to the protocol listed in Example 1. This device was designed for when the site has less higher molecular weight species (or larger molecules) and significantly more mid-range targets requiring additional stronger sorbent material. This tube replaces the Carbotrap™ Y sorbent or Carbopack™ Y sorbent in Example 2 with Carbotrap™ B sorbent or Carbopack™ B sorbent, which is a stronger adsorbent. The sorbent device included the following types of sorbent materials (in order from the sampling inlet side of the tube to the sampling outlet side of the tube): Carbotrap™ F sorbent or Carbopack™ F sorbent, Carbotrap™ B sorbent or Carbopack™ B sorbent, Carbotrap™ X sorbent or Carbopack™ X sorbent and a Carboxen™ sorbent.

Example 5

Figure 7:
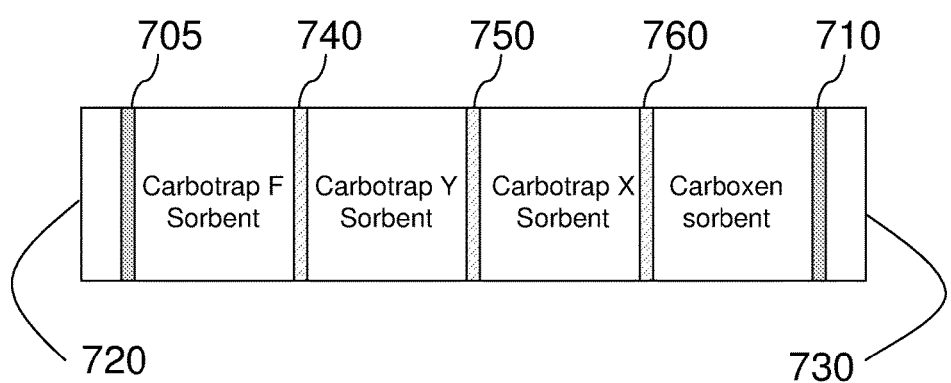
FIG. 7 an illustration of a sorbent device comprising four different types of sorbent materials, in accordance with certain examples.

Tubes made according to Example 2 were spiked with a very concentrated standard, 25.6 micrograms total of 86 target analytes plus 10 micrograms of diesel. The 86 components are listed in Table I shown in FIG. 6. A schematic of the tube is shown in FIG. 7. From left to right (sampling inlet 720 to sampling outlet 730), the tube included Carbotrap™ F sorbent (20/40 mesh), Carbotrap™ Y sorbent (20/40 mesh), Carbotrap™ X sorbent (20/40 mesh) and Carboxen™ sorbent (60/80 mesh) About 1-2 mm of open space was present at the sampling outlet end of the tube. A clip or retaining spring 710 was inserted following the strongest adsorbent to secure the bed. The sampling inlet 720 included a stationary fluid permeable membrane 705 to retain the sorbent material. Stainless steel meshes 740, 750 and 760 were used to separate the different sorbent materials. The relative weight range of each material could vary as follows: 1.4 to 0.6 of Carbotrap™ F sorbent, 1.54 to 0.56 of Carbotrap™ Y sorbent, 1.92 to 0.82 of Carbotrap™ X sorbent and 1.5 to 0.64 of Carboxen sorbent normalized to weakest adsorbent weight.

Break through, recovery (carryover), precision, linearity, reporting limit, and minimum detectable limit (mdl) studies were performed as follows: tubes were spiked with the very concentrated standard, 25.6 micrograms total of the 86 target analytes in Table I plus 10 micrograms of diesel.

Figure 8:
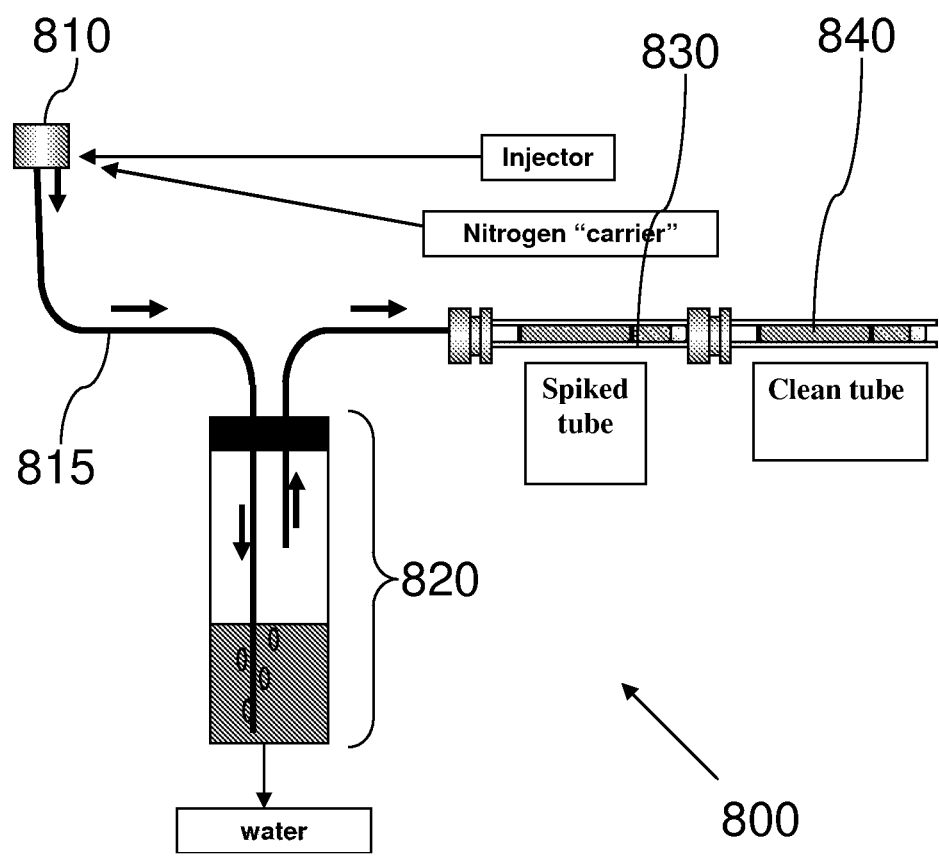
FIG. 8 is a schematic of a diagram used in testing a sorbent device; this device can be omitted in normal sample collection procedures.

After spiking, a clean tube (referred to below as a "break through tube") containing Carbotrap™ X sorbent and a Carboxen™ sorbent was connected to the spiked tube to determine breakthrough using the apparatus shown in FIG. 8, with the arrows in FIG. 8 showing the direction of carrier gas flow. The apparatus 800 included an injector 810 fluidically coupled to a nitrogen carrier gas. The nitrogen carrier gas was humidified by providing the nitrogen gas to a water reservoir 820 through a fluid line 815. The carrier gas is provided to a spiked tube 830 that included the analytes. The spiked tube was fluidically coupled to a clean tube 840. The tubes were placed on a manifold with 100 milliliters/minute of humidified (70%) nitrogen for 100 minutes to represent a 10 liter sampling volume.

Only two components were found on the break through tube. These components (and the percent breakthrough (% BT)) were:

| Component | % BT |
|---|---|
| Dichlorodifluoromethane | 1.00 |
| Chloromethane | 5.40 |

This percentage breakthrough was a substantial improvement when compared to the breakthrough of these analytes on commercially available tubes, which is typically in the 60-80% breakthrough range.

For recovery, the spiked tube was analyzed again to determine if there were any analytes remaining on the spiked tube. Of the 86 analytes spiked onto the tube at a concentration of 300 nanograms/analyte, and 10 micrograms of diesel, there was slight carryover of the heaviest component phenanthrene at 1%. The diesel carryover was less than 1%.

The precision, linearity, reporting limits and mdls all exceeded EPA criteria as follows:

| Compound Class | # Cmpds | Precision (n = 8) | Correlation Coefficient 0.2 to 200 ng on tube | Reporting Limit (10 L Volume) unit ug/m3 | MDL (10 L Volume) unit ug/m3 |
|---|---|---|---|---|---|
| Gases | 6 | 6.9% | 0.9952 | 0.05 | 0.02 |
| non-Aromatic Halogens | 33 | 2.7% | 0.9985 | 0.02 | 0.005 to 0.02 |
| Aromatics | 15 | 1.4% | 0.9995 | 0.02 | 0.005 |
| Halogenated Aromatics | 9 | 1.4% | 0.9997 | 0.02 | 0.005 |

These results were consistent with the sorbent device providing excellent analytical performance using a broad boiling point range analyte mix.

Figure 9A:
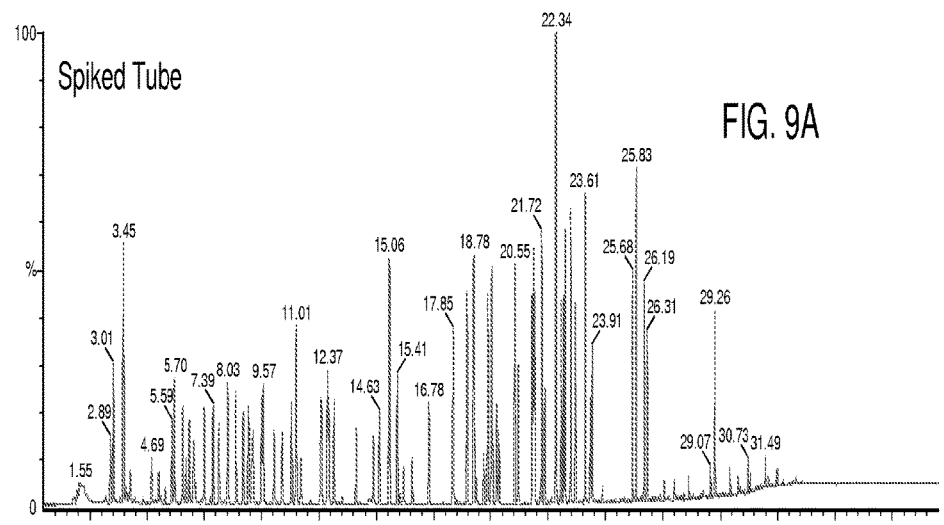
FIGS. 9A and 9B show the total ion chromatogram (TIC) of species desorbing from the sorbent device (FIG. 9A) and a TIC of a reinjected spiked tube (FIG. 9B), in accordance with certain examples.
Figure 9B:
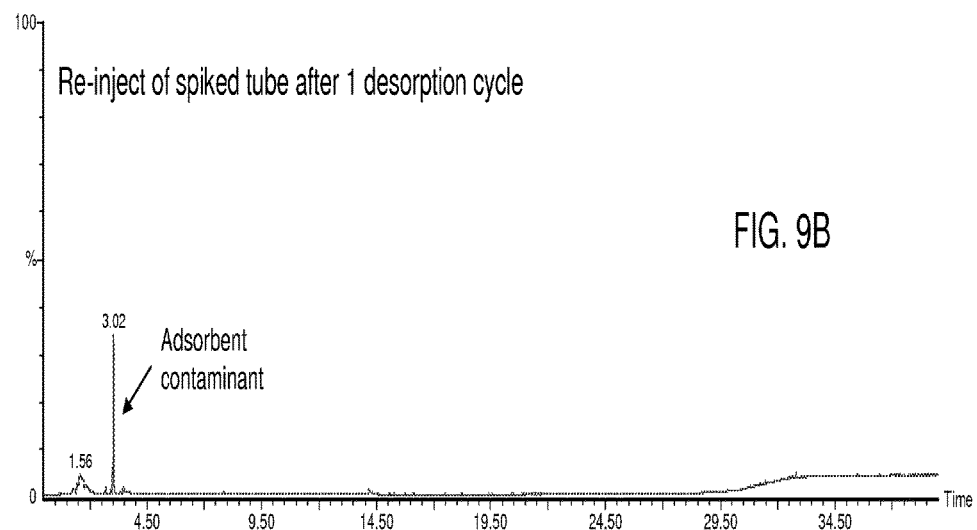
Figure 10A:
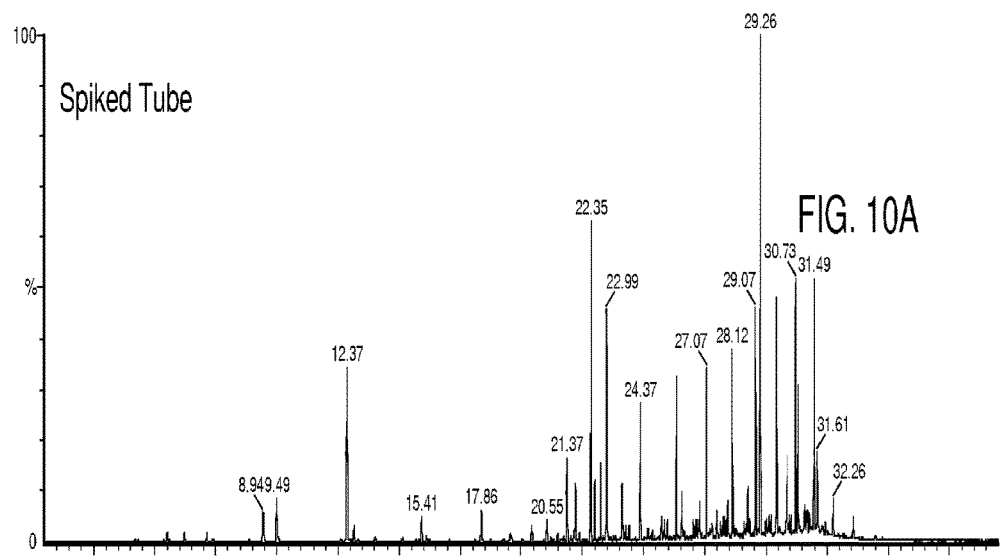
FIGS. 10A and 10B show a mass chromatogram of ion 57 (FIG. 10A) and the mass chromatogram of ion 57 from the reinjected spiked tube (FIG. 10B), in accordance with certain examples.
Figure 10B:
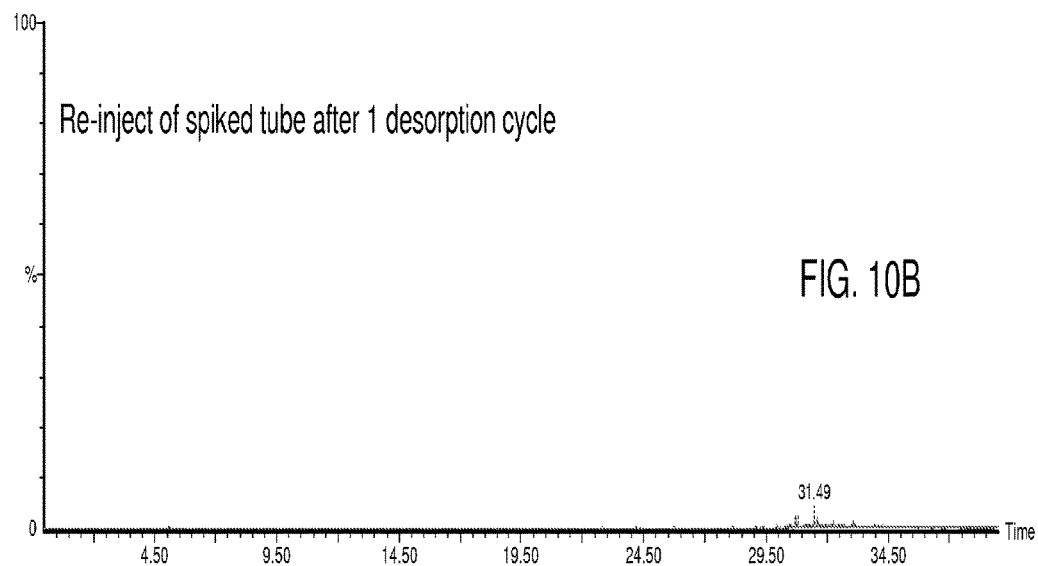
Figure 11A:
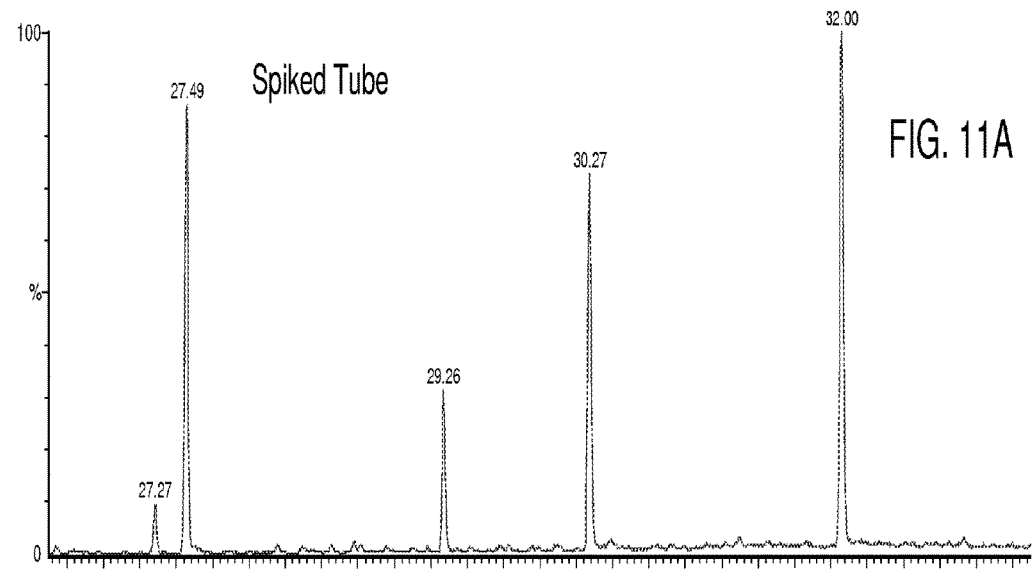
FIGS. 11A and 11B show a mass chromatogram of heavy polyaromatic hydrocarbons (FIG. 11A) and a mass chromatogram of heavy polyaromatic hydrocarbons from the reinjected spiked tube (FIG. 11B), in accordance with certain examples.
Figure 11B:
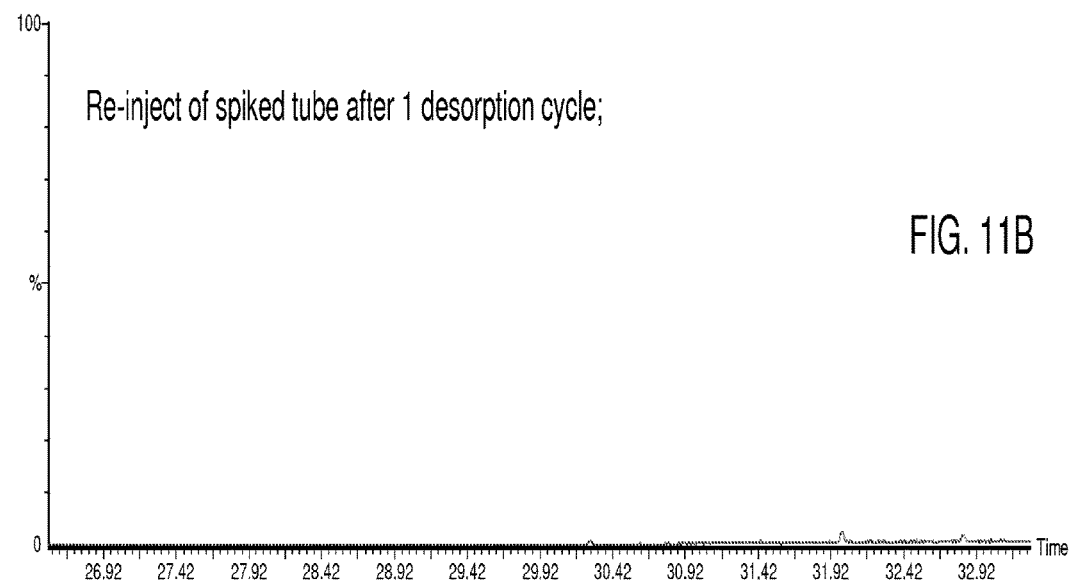

FIGS. 9A-11B graphically demonstrate the recovery of analytes from this heavily concentrated spiked tube using one desorption cycle. In each figure, the top chromatogram is the spiked tube and the bottom chromatogram is the reinjection of this spiked tube which is used to determine if there was complete desorption of the spiked tube (top chromatogram) from one desorption cycle. FIGS. 9A and 9B represent what is referred to as the Total Ion Chromatogram or the TIC which displays all the masses collected in that acquisition. FIGS. 10A and 10B represent the same injections as FIGS. 9A and 9B, respectively; however, the display is what is called a mass chromatogram of ion 57. Mass 57 is a representative ion in diesel. This enabled the view of the diesel omitting most other analytes from the view. FIGS. 11A and 11B displays the same injection as FIGS. 9A and 9B, respectively; however, the display is the mass chromatogram of the sum of the heaviest PAHs, mass 142 methyl naphthalene; mass 166 fluorene; mass 153 anthracene and mass 178 phenanthrene. Since diesel and these PAHs represent the heaviest components in the mix, the mass chromatograms were use instead of the TIC to rigorously demonstrate the desorption in one cycle of the heaviest components which are the most difficult to desorb.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A sorbent device comprising a body comprising a sampling inlet, a sampling outlet and a cavity between the inlet and the outlet, the cavity comprising a serial arrangement of at least four different sorbent materials each effective to adsorb and desorb species, in which the at least four different sorbent materials are arranged from a material with a weakest sorbent strength to a material with a strongest sorbent strength, according to their relative ability to adsorb the species, with the weakest sorbent strength material adjacent to the sampling inlet, further comprising a fluid permeable barrier disposed on the sorbent material and disposed between each of the at least four different sorbent materials, and wherein at least three of the at least four different sorbent materials comprises a graphitized carbon black with none of the sorbent materials being the same.

2. The device of claim 1, in which one of the at least four different sorbent materials comprises a mixture of graphitized carbon blacks of different strengths, graphite, carbon molecular sieves, polymer resins, an oxide, fused silica beads, glass, quartz, charcoal, porous polymers, or amisorbs.

3. The device of claim 1, in which the fluid permeable barrier comprises a steel mesh.

4. The device of claim 1, in which at least one of the at least four different sorbent materials is a carbon molecular sieve with none of the materials being the same material.

5. The device of claim 1, in which the at least four different sorbent materials are effective to desorb substantially all volatile organic species adsorbed to the four different sorbent materials in a single desorption cycle.

6. The device of claim 5, in which the at least four different sorbent materials are effective to be reused without any temperature treatment steps after the single desorption cycle.

7. A sorbent device effective to adsorb and desorb volatile organic species in a sample, the sorbent device comprising a hollow tube comprising a body, a sampling inlet and a sampling outlet, the body comprising an interior volume in which at least four different sorbent materials are disposed, the at least four different sorbent materials being effective to desorb substantially all of the volatile organic species adsorbed to the at least four different sorbent materials by heating the sorbent device in a single desorption cycle from a starting temperature to a final temperature, in which the at least four different sorbent materials are arranged serially from a material with a weakest sorbent strength to a material with a strongest sorbent strength, according to their relative ability to adsorb species, with the weakest sorbent strength material adjacent to the sampling inlet, in which the at least four different sorbent materials are separated from each other by a fluid permeable barrier that is disposed on the sorbent material and disposed between each of the at least four different sorbent materials and wherein at least three of the at least four different sorbent materials comprises a graphitized carbon black with none of the sorbent materials being the same.

8. The device of claim 7, in which each of the at least four different sorbent materials independently is a graphitized carbon black with none of the materials being the same material and wherein each fluid permeable barrier comprises a steel mesh.

9. The device of claim 7, in which the fluid permeable barrier comprises a steel mesh.

10. The device of claim 7, in which one of the at least four different sorbent materials comprises a mixture of graphitized carbon blacks of different strengths, graphite, carbon molecular sieves, polymer resins, an oxide, fused silica beads, glass, quartz, charcoal, porous polymers, or amisorbs.

11. The device of claim 7, in which one of the at least four different sorbent materials is a carbon molecular sieve with none of the materials being the same material.

12. The device of claim 7, in which the at least four different sorbent materials are effective to be reused without any temperature treatment steps after the single desorption cycle.

13. A method comprising:
exposing a sorbent device to an environment comprising volatile species to permit the volatile species to adsorb to the sorbent device, the sorbent device comprising at least four different sorbent materials in which the sorbent materials are arranged from a material with a weakest sorbent strength to a material with a strongest sorbent strength, according to their relative ability to adsorb species, with the weakest sorbent strength material adjacent to a sampling inlet of the sorbent device, in which the sorbent device further comprises a fluid permeable barrier disposed on the sorbent material and disposed between each of the plurality of the at least four different sorbent materials, and wherein at least three of the at least four different sorbent materials comprises a graphitized carbon black with none of the sorbent materials being the same; and
desorbing the species adsorbed to the sorbent device by heating the sorbent device in a single desorption cycle to desorb substantially all adsorbed species in the sorbent device, in which the single desorption cycle comprises a single heating step of heating the sorbent device from a starting temperature to a final temperature to desorb substantially all the adsorbed species.

14. The method of claim 13, further comprising reusing the sorbent device to permit adsorption of volatile species to the sorbent device without any further temperature treatment steps to remove residual adsorbed species.

15. The method of claim 13, in which one of the at least four different sorbent materials comprises a mixture of graphitized carbon blacks of different strengths, graphite, carbon molecular sieves, polymer resins, an oxide, fused silica beads, glass, quartz, charcoal, porous polymers, or amisorbs.

16. The method of claim 15, in which one of the at least four different sorbent materials is a carbon molecular sieve with none of the materials being the same material.

* * * * *